United States Patent [19]

Schultz

[11] 3,970,009

[45] July 20, 1976

[54] FLUID RAILROAD PASSENGER CAR SUSPENSION

[75] Inventor: John C. Schultz, Buffalo, N.Y.

[73] Assignee: Houdaille Industries, Inc., Buffalo, N.Y.

[22] Filed: Sept. 24, 1973

[21] Appl. No.: 399,918

[52] U.S. Cl. ............................ 105/164; 60/469; 91/1; 105/199 A; 105/199 C; 105/199 R; 105/210; 105/212; 105/453; 280/6.1

[51] Int. Cl.² ................... B61F 3/08; B61F 5/16; B61F 5/24; B61F 5/38

[58] Field of Search ............ 29/148.3, 235; 60/469; 91/1, 462; 92/85; 105/164, 453, 197 R, 197 B, 199 R, 199 A, 199 C, 210, 212; 277/84; 280/6.1; 308/36.1; 403/359

[56] References Cited

UNITED STATES PATENTS

| 443,112 | 12/1890 | Randall | 105/453 |
|---|---|---|---|
| 717,304 | 12/1902 | Wands | 105/197 R |
| 758,604 | 4/1904 | Downer | 105/197 B |
| 2,474,471 | 6/1949 | Dolan | 105/164 |
| 3,083,027 | 3/1963 | Lindblom | 280/6.1 |
| 3,374,015 | 3/1968 | Geis | 403/359 |
| 3,392,635 | 7/1968 | Sperl et al. | 92/85 |
| 3,401,989 | 9/1968 | Gies | 308/36.1 |
| 3,444,787 | 5/1969 | Gies et al. | 91/462 |
| 3,447,226 | 6/1969 | Davis | 29/235 |
| 3,455,563 | 7/1969 | Gies et al. | 277/84 |
| 3,521,527 | 7/1970 | Gies et al. | 91/1 |
| 3,528,114 | 9/1970 | Gies et al. | 60/469 |
| 3,551,980 | 1/1971 | Davis | 29/148.3 |

Primary Examiner—Robert J. Spar
Assistant Examiner—Howard Beltran
Attorney, Agent, or Firm—Hill, Gross, Simpson, Van Santen, Steadman, Chiara & Simpson

[57] ABSTRACT

A railroad passenger car suspension system in which a car body is supported on trucks in the running mode through rotary hydraulic actuators. All of the necessary conditions for passenger comfort, increased train speed and safety are met. The level of centrifugal force at curves is sensed and the car tilted so that the direction of force is felt by the passengers in a comfortable manner. Flush floor level of the car with station platforms, regardless of passenger load, wheel wear or platform level is attained. Lowered spring rate in the suspension system provides improved ride characteristics. Means are provided for steering the car trucks.

20 Claims, 20 Drawing Figures

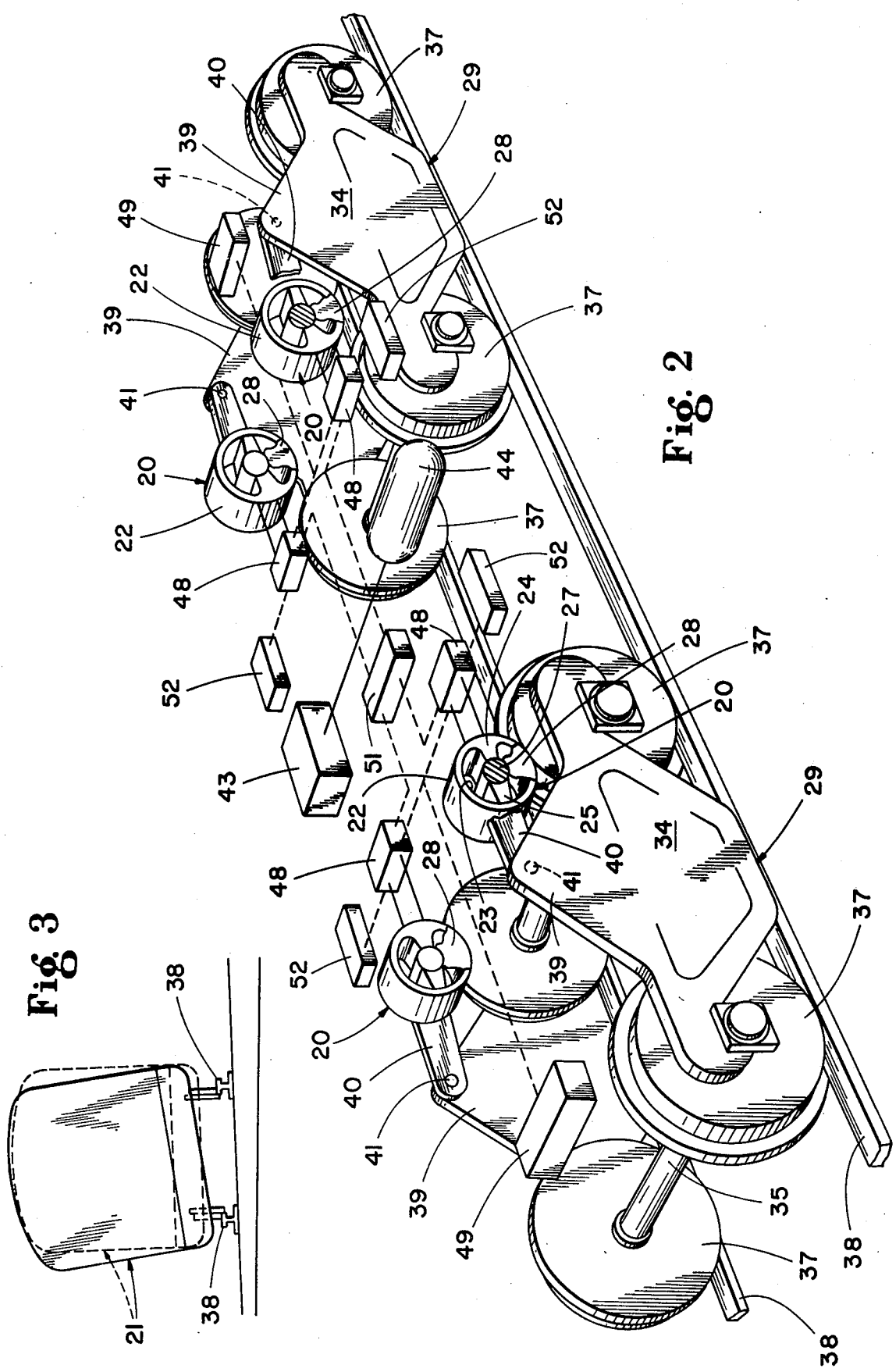

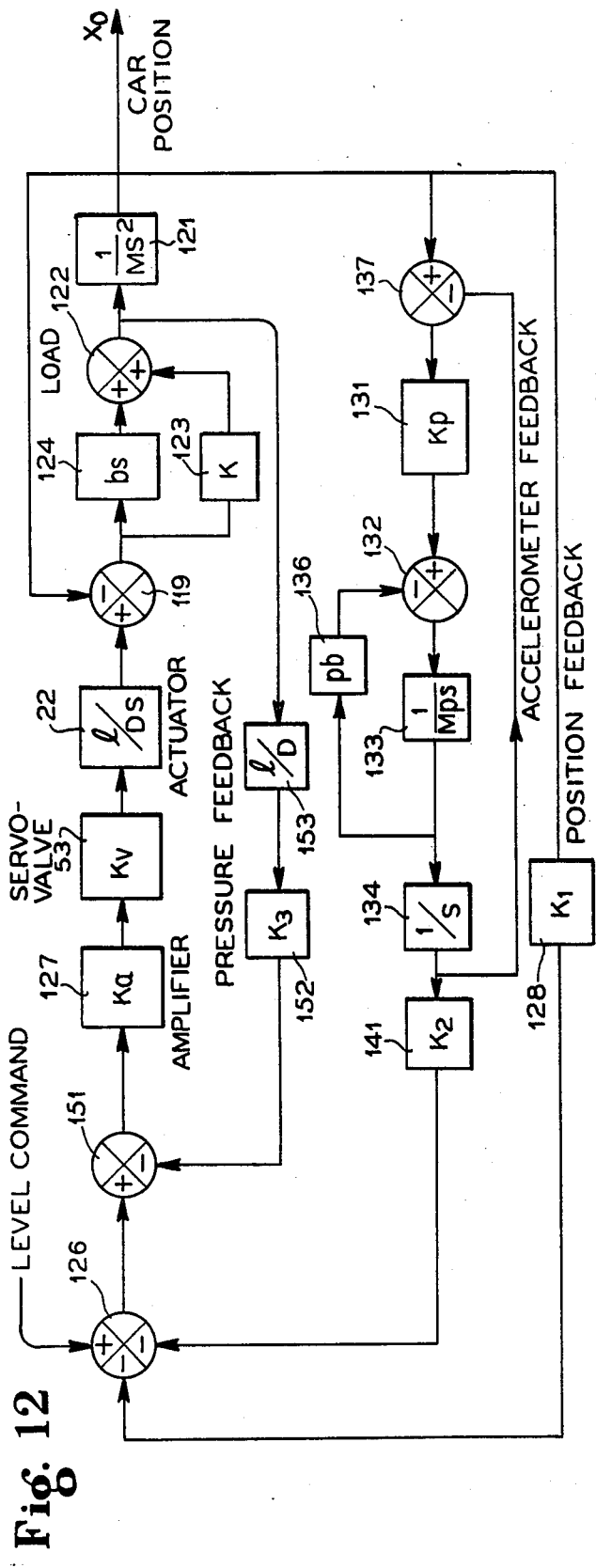
Fig. 12
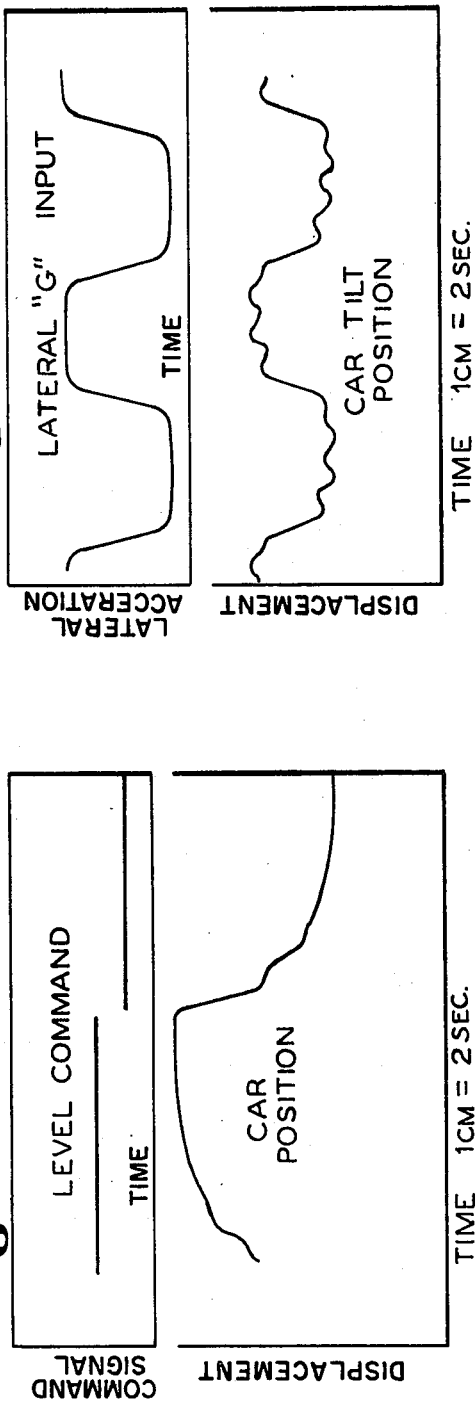
Fig. 11
Fig. 10

3,970,009

FLUID RAILROAD PASSENGER CAR SUSPENSION

This invention relates to railroad passenger cars, and is more particularly concerned with a new and improved car suspension system particularly adapted for high speed operation over conventional trackage.

The goals in railroad passenger cars for the mass movement of people are to provide safety, passenger comfort, and to increase train speeds. However, conventional rapid transit and mainline rail passenger car suspension systems have remained essentially unchanged during the past 20 or 30 years. Conventional suspension systems are generally of the "passive" type consisting of coil springs and/or air bags with hydraulic shock absorbers or friction snubbers to control lateral and vertical motion. Such suspension systems function tolerably well at low speeds and provide a reasonably comfortable ride at such speeds. However, at high speeds, because of suspension design and track conditions, a number of problems and disadvantages become apparent. There is marginal riding comfort due to the transmissibility of input vibrations. Harsh lateral riding is experienced because of changes in track direction. Lateral instability is a problem because of wheelset hunting. Speeds must be reduced on curves because of inadequate track banking.

An important object of the present invention is to overcome the foregoing and other disadvantages, deficiencies, inefficiencies, shortcomings and problems in prior railroad passenger car suspension systems and to attain important improvements and advantages by replacing the springs and shock absorbers of conventional systems by fluid power and electrohydraulic technology.

Another object of the invention is to provide a more stable railroad passenger car suspension system permitting higher speeds on existing trackage.

A further object of the invention is to provide a new and improved railroad passenger car suspension system with a lower spring rate, reducing the system's natural frequency and providing a softer ride over the entire speed range travel of the car.

Still another object of the invention is to provide a new and improved railroad passenger car suspension system with a self-leveling mechanism so that the car will always be at platform height regardless of passenger load and other variable factors.

Yet another object of the invention is to provide a new and improved railroad passenger car suspension system with a truck steering mechanism which eliminates the lateral instability caused by wheelset hunting, as well as the harsh lateral ride caused by changes in track direction such as when entering or leaving curves.

A still further object of the invention is to provide a new and improved railroad passenger car suspension system with novel tilting means for negotiation of curves at high speeds.

A yet further object of the invention is to provide a new and improved railroad passenger car suspension system which is inherently capable of failsafe operation, eliminating any need for a secondary backup system.

Other objects, features and advantages of the invention will be readily apparent from the following description of certain preferred embodiments thereof, taken in conjunction with the accompanying drawings although variations and modifications may be effected without departing from the spirit and scope of the novel concepts embodied in the disclosure, and in which:

FIG. 2 is a schematic illustration illustrating various components of the suspension system.

FIG. 3 is a schematic illustration demonstrating control of the car body at high speed on a banked curve.

FIG. 10 is a graph illustrating level control step response.

FIG. 11 is a graph illustrating tilt control ramp response.

FIG. 12 is a block diagram of a modification of the computing portion of the control system of a car.

Figure 1:
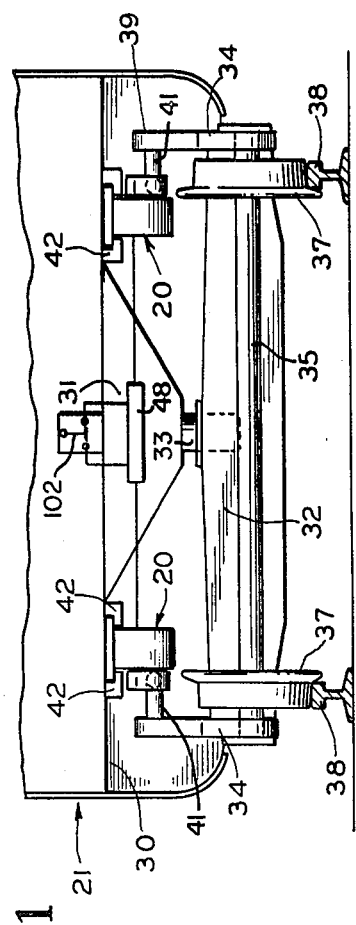
FIG. 1 is a schematic fragmentary and elevational view of a railroad passenger car illustrating certain features of the invention.

Having reference to FIGS. 1 and 2, an active hydropneumatic suspension system according to the present invention includes as main components vane type hydraulic rotary actuators 20 which replace the conventional shock absorbers and springs in the suspension system for a railroad passenger car 21. Each of the actuators 20 comprises a housing 22 having therein generally cylindrical working chamber 23 divided into working subchambers by fixed abutment 24 and a wing shaft 25 rigid with a wing shaft 27 relatively rotatably supported within the housing by and between opposite end closures 28 carried by the opposite ends of the housing 22 in normally closing relation to the working chamber 23. As shown, the actuators 20 are merely schematic illustrations, and for brevity of description reference is made to U.S. Pat. 3,444,787 disclosing rotary vane suspension units for heavy duty purposes and in principle adaptable for the present purposes, and to any extent necessary for a complete understanding said patent is incorporated herein by reference. Other U.S. patents having pertinent disclosures in respect to rotary hydraulic actuators relevant to the present disclosure and which, to any extent necessary are included herein by reference, are Nos. 3,374,015; 3,392,635; 3,401,989; 3,447,226; 3,551,980; 3,455,563; 3,521,527 and 3,528,114.

According to the present invention, and in a typical installation as represented in FIGS. 1 and 2, the actuators 20 are mounted in a symmetrical, balanced relation between a pair of railway car trucks 29, one being located at one end of the car 21 and the other being located at the opposite end of the car 21, and the body of the car having a floor 30 carrying bolsters 31 over truck frame bolsters 32, with pivot means such as a pin 33 pivotally connecting the bolsters and permitting relative vertical separating movement between the bolsters when the car body is suspended over the trucks 29 by means of the actuators 20. Each of the trucks 29 has opposite side frames 34 supported on or carrying the usual bearings for the journals for axles 35 of wheels 37 supporting the car on rails 38.

Two of the actuators 20 are connected to and between each of the car trucks 29 and the car body. For this purpose, one of the actuators of each pair is located adjacent to one side of the car body inwardly adjacent to an upstanding truck frame portion 39 and the other of the pair of actuators is mounted at the opposite side of the car body inside adjacently spaced from the corresponding upwardly projecting portion 39 at that side. In a preferred arrangement, each of the actuators 20 has its wing shaft 27 projecting outwardly from the enclosure 28 nearest the truck frame portion 39 and with a torque arm 40 rigidly coupled to the projecting portion of the wing shaft and extending in an outboard endwise generally horizontal direction to a pivotal connection 41 at its outboard end portion with the frame portion 39, the pivotal connection being by means of a universal joint, such as a ball joint.

Mounting of the actuators 20 on the underside of the car body bottom 30 is in such a manner as to provide a relatively fixed but not rigid coupling permitting sufficient lost motion for relative swiveling movements of the trucks 29 and the car body in negotiating turns. For this purpose suitable means such as suitably longitudinally arcuate gib ways 42 may be secured to the car bottom 30 and mounting the actuator bodies 22 firmly to the car body but permitting sufficient fore and aft arcuate movement about the axis of the connecting pin 33 during turning of the truck in either direction, the actuators 20 remaining at all time in coaxial relation to one another. Through this relationship, relative movement between the car body and the trucks will induce rotation of the actuator shafts 27 relative to the actuator housings 22, and conversely, hydraulic pressure input to the rotary actuators will change the relative position of the car body to the trucks.

At rest and with hydraulic and electrical systems shut down, the car body will rest passively through its bolsters 31 on the truck bolsters 32. In this mode switching and idling run of the car can be effected in conventional manner, and the actuators can be controlled to provide internal hydraulic damping through the conventional cross porting or valving of the respective wing shafts 27. Thereby the actuators will function as rotary dampers. Normally, however, the car body is supported by the hydraulic actuators 20 which are mounted at four points relative to the body such that each corner can be controlled by the respective actuator 20.

Figure 5:
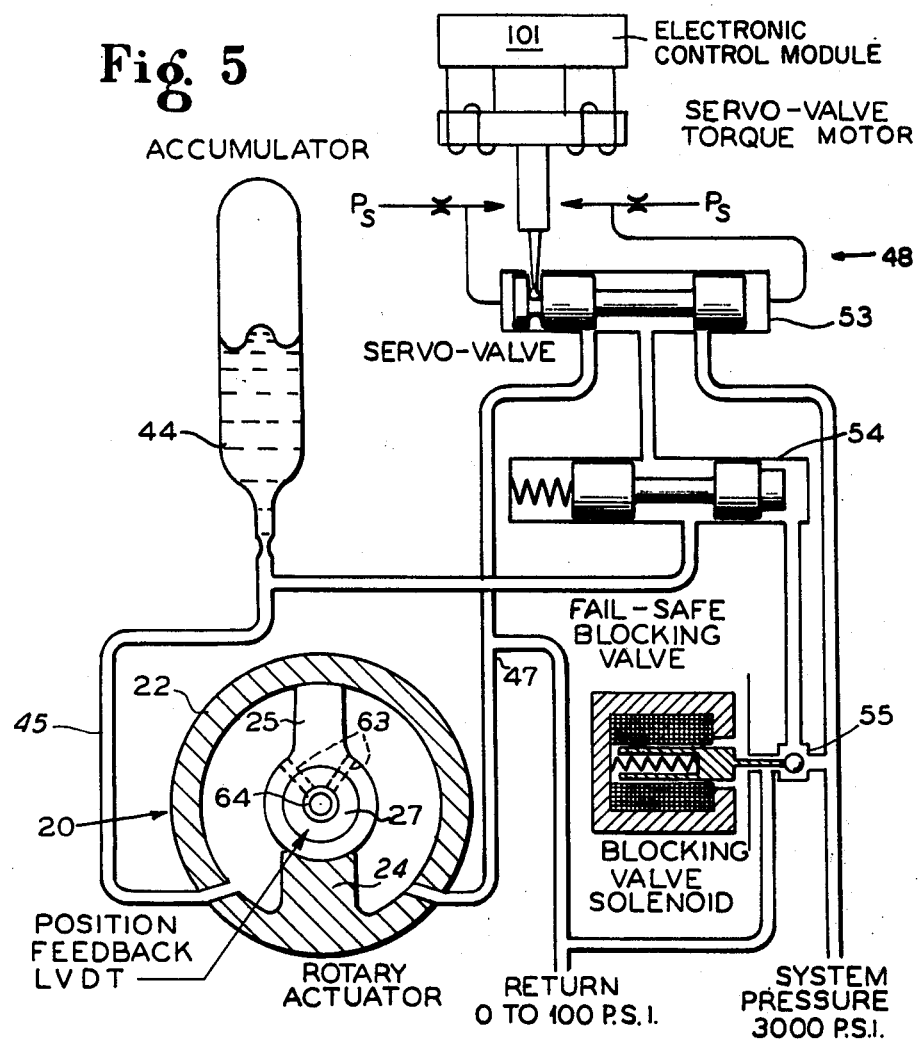
FIG. 5 is a schematic illustration of one of the actuators of the suspension system and details of certain control valving and related structure.

In operation of the system, a suitable hydraulic power supply 43 (FIG. 2) is activated. Such power supply may be of a capacity to supply a string of cars or it may be for each individual car. For example, the hydraulic power supply 43 may be located in a locomotive and suitably coupled through high pressure couplers with each car coupled to the locomotive. In a unit train arrangement where a plurality of cars are coupled togther and one of the cars serves as a driving unit, that car may be equipped with the hydraulic power supply 43. In any event, when the power supply 43 is activated, at least one hydropneumatic accumulator 44 is charged (there may be a single accumulator for each car suspension system or there may be a separate accumulator for each of the actuators 20 as indicated in FIG. 5) and suitable hydraulic communication is effected between each of the actuators and the hydraulic power source 43 by way of a hydraulic pressure supply line 45 communicating with the upper subchamber of each of the actuators 20, while a return or low pressure line 47 communicates with the lower chamber of each of the actuators. It is with the pressure supply line 45 that the accumulator 44 or respective accumulators 44 have operating connection as indicated in FIG. 5. Charging of the actuators 20 with hydraulic pressure fluid effects rotation of the wing shafts 27 by pressure of the fluid between the respective abutments 24 and the vanes 25 to actuate the arms 40 acting as levers between the actuators and the truck frames to raise the car body to the sprung position. In this active hydropneumatic suspension, the sprung position at each of the actuators 20 is dictated by a valve package 48 capable of various functions including maintaining the relative position of the car body and the trucks regardless of load conditions wherein the car body is supported in hydropneumatic suspension, the accumulator air volume and charge establishing the spring rate. Thereby a lower spring rate is provided than is physically possible with mechanical springs. The hydraulic power source makes up for leakage in the system, and since the actuators are in the active or dynamic mode, damping is appropriately controlled by suitable valving in the package 48 which has the capability of restricting flow from the actuators and into and out of the accumulator or accumulators 44 to provide damping. Operation of such valving is determined by sensing accelerometers 49 which will discriminate against high frequency disturbances and thereby actuate damping valve means only when required at resonant frequencies and providing for the desirable ride features of the present suspension system.

For high speed banking, the hydraulic rotary actuators 20 are controlled as a tilting mechanism to provide an additional banking so that the car 21 can negotiate curves at higher speeds. For example, this will permit the use of trucks designed for rapid transit service on mainline service where existing trackage will not permit high speed travel on curves without additional banking of the tracks or the car body. For this purpose, a set of accelerometers (only one being shown in FIG. 2) appropriately positioned will detect centrifugal forces resulting from rounding curves and will with proper amplification and feed back override the leveling valve and adjusting valve in the package 48 and will initiate rotation to appropriate ones of the actuators 20 to tilt the car about a longitudinal axis relative to the road bed in order that the G forces are more desirable to the passengers. As demonstrated in FIG. 3, where the car 21 travels around a banked curve, instead of remaining in its normal attitude to the rails 38 or even tilting toward the outside of the curve as indicated in dash outline, will assume a more comfortable and safer inwardly tilted position as shown in full outline. This is effected by oil under pressure from the power source being directed to the rotary actuators on the high side to effect lift and alternatively or in addition draining from the actuators on the low side as the car enters and runs in the curve and then returning the system to level ride when the car leaves the curve. Thereby the low pivot point bank system is effected. Appropriately located sensors 52 will mechanically, optically, or electronically identify various platform heights regardless of passenger load and by means of signals directed to the valve packages 48 automatically adjust the attitude of the car body to meet the condition sensed. Thereby the car body will adjust automatically in its suspended height for flush orientation of the car floor with the platform along which the car stops for safe and rapid loading and unloading of passengers.

Within each of the valve packages 48 there is located a servovalve 53 (FIG. 5), a fail safe blocking valve 54 and a solenoid operated blocking valve 55.

Figure 4:
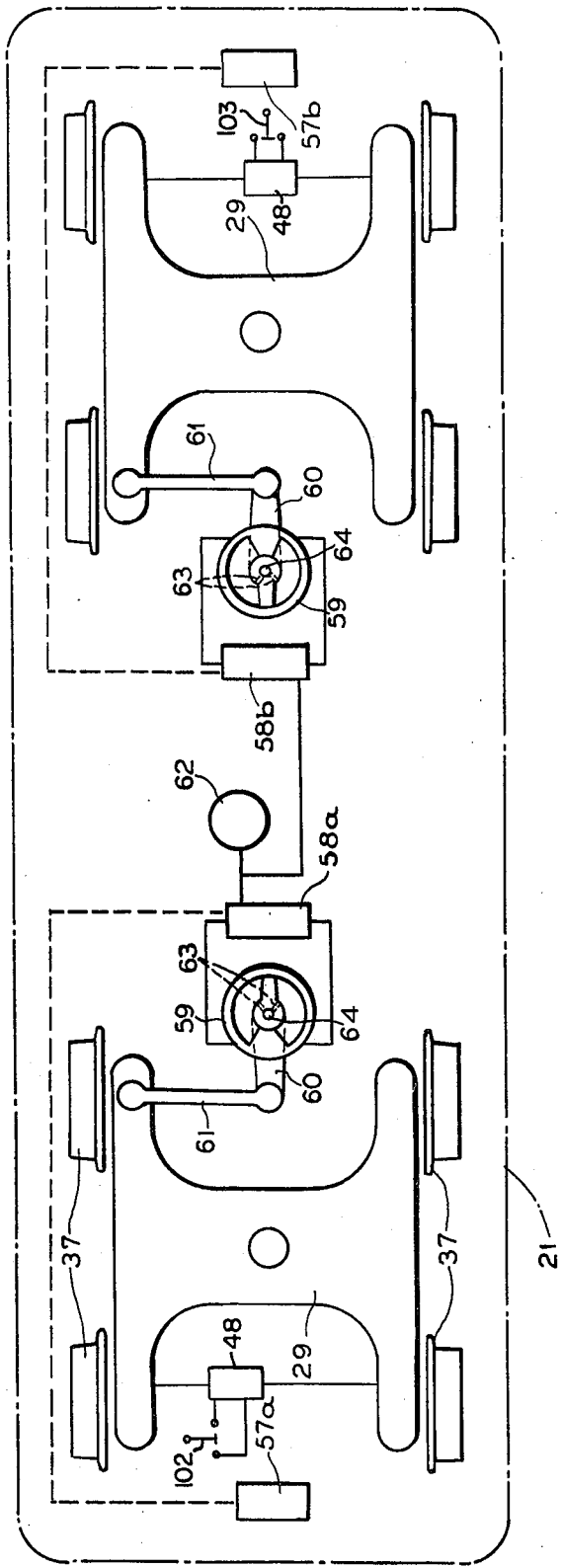
FIG. 4 is planned schematic view illustrating lateral and steering control in the suspension system.

Lateral ride control is attained substantially as represented in FIG. 4. A primary consideration in lateral ride control is to minimize the lateral vibrations which occur at resonant frequencies, and low amplitude disturbances which occur at high frequencies, that is at high speeds. A secondary but equally important consideration is to provide cushioning of the car body into the lateral stops of couplings between the car body and the trucks when entering and leaving curves, that is when changing direction. According by the present invention satisfies both the requirements for damping normal lateral oscillations on tangent trackage and also the low velocity, high force movements that occur when going into and leaving curves.

Lateral motion on tangent track occurs because of track variations, road bed conditions and truck hunting. These motions are sensed for amplitude by detector means comprising properly oriented accelerometers 57 at the respective opposite ends of the car 21. Signals or impulses from the accelerometers 57 are relayed to a steer/damp valve package 58 that will automatically adjust an actuator damp valve in the package 58 to produce the correct amount of damping in a respective hydraulic actuator or damper 59 of the rotary vane type coupled through an arm 60 attached to its wing shaft and a link 61 to the associated truck 29. The body of the actuator 59 in each instance is fixedly secured to the car body. A hydraulic power source 62 is connected through the steer-damping valve packages 58 with the respective actuators.

In order to change the attitude of the car body to the truck at a uniform rate and thus provide a smooth transition from tangent to curve and vice versa in the operation of the car, the trucks 29 are steered by the rotary actuators 59. For this purpose, the track curvature detector means senses the change in truck direction prior to entering or leaving a curve and relay a signal to the steer-damp valve package 58 and thereby effect the transmission of hydraulic power from the sources 62 to the respective actuator 59.

Both with respect to the suspension actuators 20 and the lateral ride control actuators 59, a built-in fail-safe control prevails, thereby eliminating the need for a secondary back-up system. Each of the rotary actuators has means for converting it to a passive damping or shock absorbing system when its power source is cut off. This is accomplished by opening damping orifices 63 between the working subchambers within the actuator. Sensors in the active system will register the failure and automatically convert the actuators from a power transmission device to an energy absorbing device by shutting off the power source and opening the damp orifice, as by means of a control valve 64 in the connection between the orifices 63. As shown in FIG. 2, the actuators 20 are attached to the bottom 30 of the car body as illustrated in FIG. 1. Also, the hydraulic power supply 43, the accumulator 44, the valve packages 48, the sensors such as the sensing accelerometers 49, the mechanically optically electronically sensors 52 are connected to the bottom of the car 430 as illustrated in FIG. 2 and FIG. 1.

Figure 6:
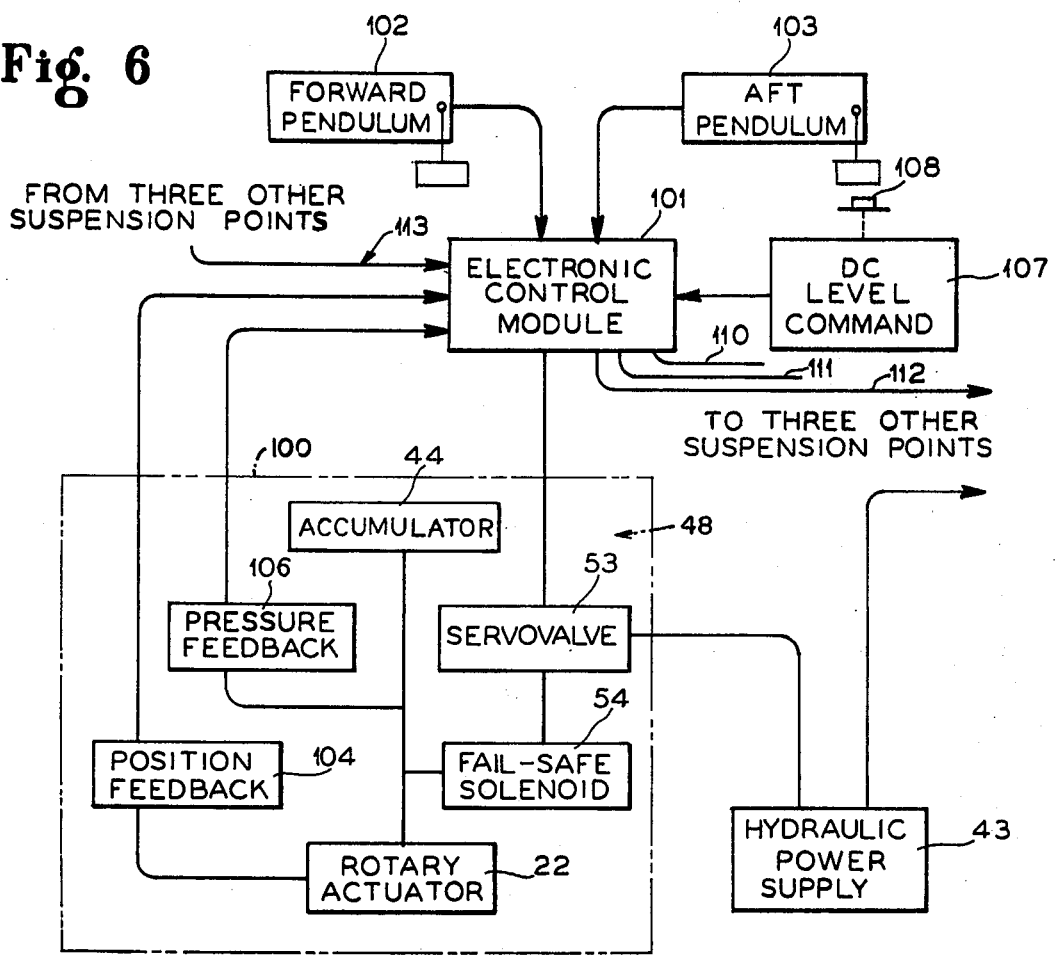
FIG. 6 is a block diagram of the control system for the suspension.

FIG. 6 illustrates in block form the control system schematic for a single rotary actuator control module 100 which in turn receives an input signal from the electronic control module 101 which in turn receives inputs from the forward pendulum 102 and the aft pendulum 103 and a DC level command 107 which may be set as for example by manual knob 108. The electronic control module supplies an input to the servovalve 53 which also receives an input from the hydraulic power supply 43 and supplies an output through the fail-safe solenoid 54 to the rotary actuator 22. The accumulator 44 is connected to the rotary actuator 22. A pressure feed-back transducer 106 is connected to the rotary actuator and produces an electrical output which is indicative of the pressure in the hydraulic system at the rotary actuator. A position feedback transducer 104 is connected to the rotary actuator and produces an electrical output indicative of the position of the rotary actuator which is supplied as a position feedback signal to the electronic control module 101. It is to be realized that the apparatus in FIG. 6 controls a single rotary actuator 22 in response to the output of the electronic controlled module 101 which in turn receives inputs from the sensors 102, 103 and the DC level command 107 as shown in FIG. 6. Each of the other three rotary actuators 22 would be respectively controlled by the outputs of the electronic control module on leads 110, 111 and 112.

It is to be realized of course that the electronic control module 101 also supplies control signals on line 110, 111, and 112 to the other three rotary actuators at each corner of the car for controlling the vertical position of the car. For this purpose the electronic control module receives pressure and feedback signals on inputs designated generally as 113 from the other three suspension points.

Thus, it is seen that the servovalve 53 provides active control of the actuator accumulator suspensions system. It is to be realized that the fail-safe solenoid will shut out the active portions of the suspension system when electrically energized. This valve will also automatically shut off if hydraulic pressure is lost and when the servovalve is blocked the conventional suspension system is utilized.

During normal operation the wheels will be driven to a preselected position regardless of load by the servovalve 53 using the LVDT for positional feedback information. This position can be programmed in the electronic control module 101 for optimum wheel-car spacing during transit as well as for various platform levels.

When the train goes into a curve the input signals from the pendulums 102 and 103 provide electrical signals into the electronic control module 101 so as to differentially actuate the rotary actuators 22 on the left and right sides, respectively, above and below the normal level so as to provide the proper tilt to the car. The proper tilt of the car is determined when the pendulums 102 and 103 are in a position perpendicular to the car floor which position removes all of the lateral G forces. During all operation proper car damping is provided by controlling the dynamic pressure forces with the feedback control loops of the system.

Figure 7:
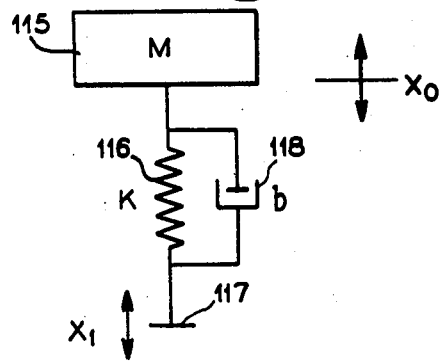
FIG. 7 is a schematic diagram for explaining the physical properties of the support system.
Figure 8:
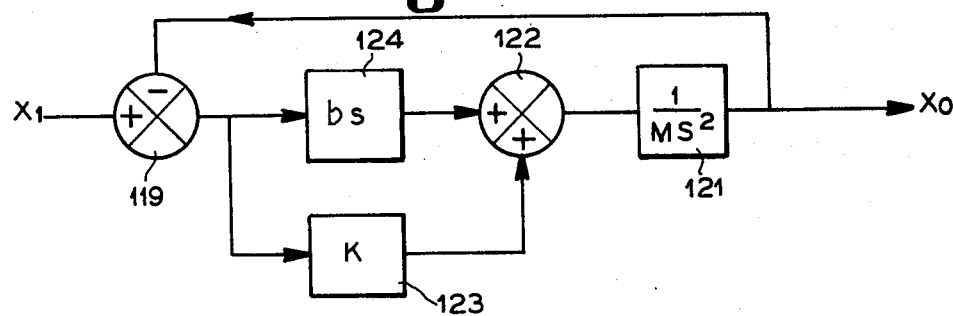
FIG. 8 is a block diagram of the suspension control system illustrated in FIG. 7.

FIGS. 7 and 8 are used for describing the control system. FIG. 7 illustrates a standard passive suspension system which has the mass 115 supported on a spring 116 having a spring constant K above a support point 117 which, for example, may be a wheel. A dashpot 118 is mounted between the mass and the wheel 117 for damping purposes.

FIG. 8 is a block form of the suspension system of FIG. 7 and illustrates an adder 119 which receives an $x$ position input as well as a feedback signal from operational amplifier 121 which has a characteristic of $(1/MS^2)$ where $S$ is the LaPlace operator. A second adder 122 receives an input from an amplifier 123 having a gain equal to K, the spring constant, as well as an input from an operational amplifier 24 which has a gain of $bs$.

Figure 9:
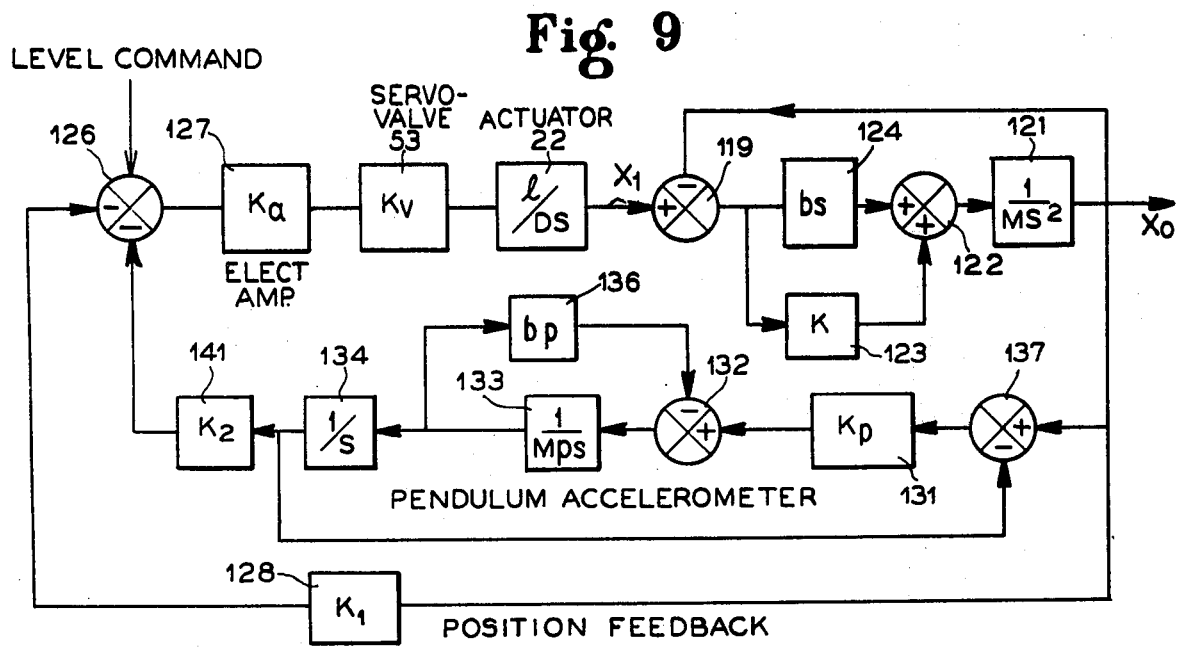
FIG. 9 is a block diagram of the computer portion of the suspension control system of the car.

FIG. 9 is a block diagram of the control system wherein the load system of FIG. 8 is combined with two additional loops - one for level control and one for tilt control. The level control is a very low gain loop and does not change the dynamics of the system. It will position the car to a desired level in about six seconds as shown in FIG. 10 which is plotted on a scale of one centimeter equal to two seconds.

However, the tilt control cannot be delayed for six seconds to achieve final tilt position because the car would be well into the curve in this period of time. Therefore the gain of the tilt control loop must be considerably higher than that of the level control. In a pracitcal emobodiment made according to this invention the gain was adjusted so that the car would follow reasonably well a one second ramp input. This assumes that car track will provide approximately one second of spiral at desired car speeds. Position of car tilt with increasing lateral G input as illustrated in FIG. 11 for a one second lateral G rise time. The time trace in FIG. 11 indicates considerable overshoot of the system when the accelerometer loop gains are adjusted for adequate time response. This should be expected in that the band pass of the control system is made almost equal to the band pass of the suspension system. Consequently, the addition of this control loop affects the transmissibility of the suspension system.

As shown in FIG. 9 a level command is applied to the input of an adder 126 which supplies an output to an amplifier 127 having a gain Ka and which supplies an input to the servovalve 53 which controls the actuator 22. A position feedback signal is applied to the adder 126 by transducer 128 which also supplies an input to the adder 119.

In FIG. 9, the pendulum accelerometer servo loop includes a signal transducer with an amplifier 131 which supplies an input to an adder 132 which supplies an output to the operational amplifier 133 having a characteristic of $(1/MpS)$. An operational amplifier 134 has a characteristic of $(1/S)$ and receives the output of operational amplifier 133. The feedback amplifier 136 has a gain of $hp$ and is connected between the output of amplifier 133 and adder 132. An accelerometer feedback loop is supplied by the output of the amplifier 134 to the adder 137.

The position feedback generator 128 also supplies an input to the adder 137 and to an adder 126 of the level commmand loop. An amplifier 141 receives the output of operational amplifier 134 and supplies an input to adder 126. Thus, the block diagram of FIG. 9 comprises a block diagram of the sensing and control system including the hydraulic actuators of the system in conventional servo form showing the various control loops of the system.

The system of FIG. 9 was improved by adding an additional pressure feedback loop as shown in FIG. 12. In FIG. 12, like elements are identified and represent the same elements as in FIG. 9, and the pressure feedback loop comprises the adder 151, the amplifier 152, which supplies an input to the adder 151. The adder 151 also receives the output of the adder 126 and supplies an input to the amplifier 127. The output of adder 122 is supplied to the transducer 153 which supplies an input to the amplifier 152. The transducer 153 has a characteristic of $1/D$. The loop comprising the elements 152 and 153 prevent sharp pressure rises in the suspension system; and therefore, reduce acceleration inputs to the car body. FIGS. 13–16 illustrate the improvement obtained with the pressure feedback loop.

Figure 13:
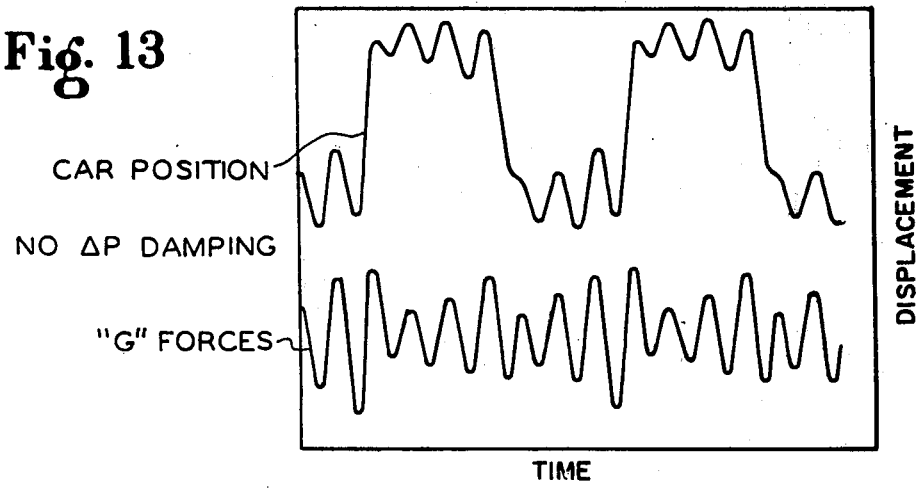
FIG. 13 is a graph which illustrates car position and "G" forces with no $\Delta P$ damping.
Figure 14:
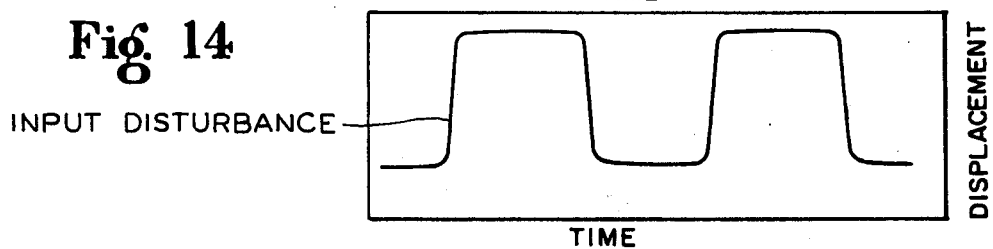
FIG. 14 is a graph which illustrates an input disturbance applied to a car.

FIG. 14 illustrates an input disturbance plotted as displacement vs. time with one centimeter equal to two seconds. in FIG. 13, the top curve indicates the car position with no $\Delta P$ damping when the input disturbance of FIG. 14 is applied. The lower curve in FIG. 13 illustrates the G forces on the car with the input disturbance of FIG. 14 applied.

Figure 15:
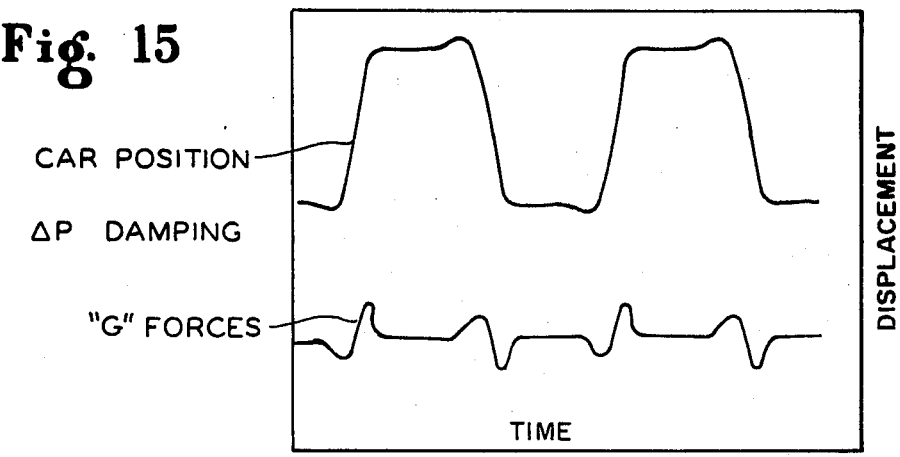
FIG. 15 is a graph which illustrates car position and "G" forces with $\Delta P$ damping, and, FIG. 16 is a graph which illustrates an input disturbance applied to a car.
Figure 16:
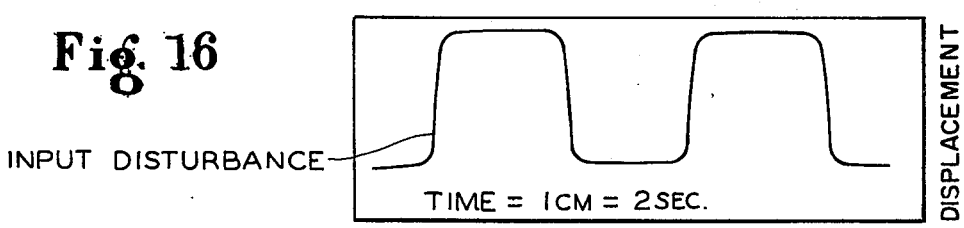

FIGS. 15 and 16, respectively, illustrate a response of the car position with delta damping and G forces with delta damping with the same input disturbance applied as in FIG. 14.

It is to be noted that the curves of FIG. 15 for both position and G forces are substantially improved with the pressure damping.

Thus, it is seen that this invention provides a control system in which rotary actuators 20 are provided for each corner of the car so as to control the height of the car above the track bed, as well as to control and maintain the car level under forward linear motion and to tilt the car under forward curved motion. The control system of the invention receives inputs from pendulums, accelerometers, and level sensors, and automatically controls the level, tilt and height of the car in accordance with the control system of the invention.

Although it has been described with respect to the preferred embodiments, the invention is not to be so limited as changes and modifications may be made therein which are within the full intended scope as defined by the appended claims.

I claim as my invention:

1. In a railroad car suspension system wherein the car has a body and trucks spaced longitudinally under the body for running along rails and for automatically positioning the body relative to said trucks,
   means coupling the car body to the trucks and for permitting vertical movement between the car body and said trucks,
   a plurality of reversible hydraulic actuator means connected to and between the car body and said trucks at different points and operable selectively to move the body relative to said truck at said points and said plurality of hydraulic actuator means connected to and between said car body and said trucks so that rotation of said body can occur about vertical axes through each truck,
   means providing a dynamic power source,
   and control means for selectively controlling the power source for supplying hydraulic fluid under pressure to said actuator means to operate the actuator means for varying the verticle positions of the car body relative the trucks at said points, and a plurality of sensor means connected to said control means and supplying inputs thereto such that said plurality of actuator means are operated to position said body relative to said trucks.

2. In a system according to claim 1, pneumatic accumulator means connected to said power source and said actuating means.

3. In a railroad car suspension system according to claim 1 wherein said actuator means comprises rotary vane units each of which has a body and a wing shaft, the bodies of the units being attached to the car body, rigid torque arms extending from the wing shafts, and means pivotally connecting said arms to the trucks.

4. In a system according to claim 1, means for controlling said actuator means to convert from active dynamic activity in the car body suspending mode to a passive damping mode.

5. In a system according to claim 1 wherein sensor means includes vertical vibration detecting means, platform height and leveling detector means, and curve tilting detector means.

6. In a suspension system according to claim 1, said control means comprising valve means between said hydraulic power source and said actuator means for controlling hydraulic power supply to the actuator means and thereby variably controlling the elevation at which the actuator means suspend the car body above the trucks.

7. In a system according to claim 6, wherein said sensor includes elevation sensing means providing signals for controlling said valve means.

8. In a system according to claim 1 wherein said control means controls the supply of hydraulic pressure fluid from said power source to said actuator means so as to control the tilt of the car body relative to the trucks.

9. A system according to claim 8, said sensor means includes an inertia sensitive pendulum device attached to said body.

10. In a system according to claim 1, wherein said control means includes a load control servo loop and a pressure feedback loop connected to said load control servo loop.

11. In a system according to claim 10 further including a level control loop.

12. In a system according to claim 11 further including a tilt control loop.

13. In a railroad car suspension system wherein the car has a body and trucks spaced longitudinally under the body for running along rails and for automatically positioning the body relative to said trucks,
a plurality of hydraulic actuators connected between and to the body and said trucks at different points and said plurality of hydraulic actuators connected to and between said body and trucks so that rotation of said body can occur about vertical axes through said trucks,
a power source connected to said plurality of hydraulic actuators for selectively operating the actuators and thereby vary the vertical position of the car body relative to said trucks,
control means connected to said power source to control hydraulic power to each of said plurality of hydraulic actuators, and
sensor means mounted on said body and connected to said control means and supplying inputs thereto such that said plurality of hydraulic actuator means are operated to position said body relative to said trucks.

14. In a system according to claim 13 wherein said control means individually controls said plurality of actuators to thereby effect level and tilt control of the car body relative to the trucks.

15. In a system according to claim 13 wherein said control means controls said plurality of actuators to control said car body in an active dynamic mode.

16. In a system according to claim 13 wherein said sensor means includes vertical vibration detecting means, detecting platform height and relative car level detecting means and curves in the track detecting means.

17. In a suspension system according to claim 13 said control means including valve means between said hydraulic power source and said actuators to control hydraulic power supplied to said actuators.

18. In a system according to claim 17 wherein said sensor means include means for sensing a condition requiring adjustment of the car body position relative to the trucks.

19. In a system according to claim 13 wherein said control means controls the supply of hydraulic pressure fluid to said plurality of actuators so as to tilt the car body relative to the trucks.

20. In a system according to claim 19 wherein said sensor means includes an inertia sensitive pendulum device.

* * * * *